(12) United States Patent
Miyata (10) Patent No.: US 10,598,399 B2
(45) Date of Patent: Mar. 24, 2020

(54) AIR CONDITIONER

(71) Applicant: Mitsubishi Electric Corporation, Tokyo (JP)

(72) Inventor: Tomomi Miyata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/076,351

(22) PCT Filed: Apr. 28, 2016

(86) PCT No.: PCT/JP2016/063350
§ 371 (c)(1),
(2) Date: Aug. 8, 2018

(87) PCT Pub. No.: WO2017/187595
PCT Pub. Date: Nov. 2, 2017

(65) Prior Publication Data
US 2019/0049136 A1    Feb. 14, 2019

(51) Int. Cl.
*F24F 11/46* (2018.01)
*F24F 11/56* (2018.01)
(Continued)

(52) U.S. Cl.
CPC ............ *F24F 11/46* (2018.01); *F24F 11/49* (2018.01); *F24F 11/64* (2018.01); *F24F 11/65* (2018.01);
(Continued)

(58) Field of Classification Search
CPC combination set(s) only.
See application file for complete search history.

(56) References Cited

U.S. PATENT DOCUMENTS 6,924,618 B2 *  8/2005  Matsushiro ........ B60H 1/00428
                                              318/800
9,203,330 B2 * 12/2015  Suzuki ...................... H02P 6/18
(Continued)

FOREIGN PATENT DOCUMENTS

JP      07-190468 A    7/1995
JP    2003-209976 A    7/2003
(Continued)

OTHER PUBLICATIONS

International Search Report of the International Searching Authority dated Jul. 26, 2016 for the corresponding International application No. PCT/JP2016/063350 (and English translation).
(Continued)

*Primary Examiner* — Charles R Kasenge
(74) *Attorney, Agent, or Firm* — POSZ Law Group, PLC (57) ABSTRACT

An air conditioner includes a controller that controls an inverter on the basis of an instruction received by a receiver. The controller includes: a rotational speed acquisition unit that acquires a specific rotational speed corresponding to a combination of an air volume and an air speed; a correction value acquisition unit that acquires a specific correction value by determining an operation mode, presence or absence of a power saving mode, and presence or absence of a sleeping mode; and a selection unit that selects three-phase operation when the specific rotational speed is lower than a threshold calculated by adding the specific correction value to a fixed value, or selects two-phase operation when the specific rotational speed is higher than or equal to the threshold.

6 Claims, 7 Drawing Sheets

(51) Int. Cl.
    *F24F 11/64*         (2018.01)
    *F24F 11/66*         (2018.01)
    *F24F 11/77*         (2018.01)
    *G05B 19/042*      (2006.01)
    *F24F 11/74*         (2018.01)
    *F24F 11/49*         (2018.01)
    *F24F 11/65*         (2018.01)
    *F24F 120/10*       (2018.01)
    *H02P 27/06*        (2006.01)
    *F24F 120/12*       (2018.01)
    *F24F 110/10*       (2018.01)

(52) U.S. Cl.
    CPC .............. *F24F 11/66* (2018.01); *F24F 11/74* (2018.01); *F24F 11/77* (2018.01); *G05B 19/042* (2013.01); *F24F 11/56* (2018.01); *F24F 2110/10* (2018.01); *F24F 2120/10* (2018.01); *F24F 2120/12* (2018.01); *G05B 2219/2614* (2013.01); *H02P 27/06* (2013.01); *Y02B 30/746* (2013.01)

(56) References Cited

U.S. PATENT DOCUMENTS

| | | | |
|---|---|---|---|
| 10,374,536 | B2 * | 8/2019 | Huang .................... H02P 6/182 |
| 2004/0207360 | A1 | 10/2004 | Matsushiro et al. |
| 2016/0054017 | A1 | 2/2016 | Takahashi |

FOREIGN PATENT DOCUMENTS

| | | |
|---|---|---|
| JP | 2004-289985 A | 10/2004 |
| JP | 2011-158170 A | 8/2011 |
| JP | 2012-105385 A | 5/2012 |
| JP | 2015-210002 A | 11/2015 |
| KR | 10-2012-0054508 A | 5/2012 |

OTHER PUBLICATIONS

Extended European Search Report dated Mar. 15, 2019 issued in corresponding EP patent application No. 16900465.2.

* cited by examiner

AIR CONDITIONER

CROSS REFERENCE TO RELATED APPLICATION

This application is a U.S. national stage application of PCT/JP2016/063350 filed on Apr. 28, 2016, the contents of which are incorporated herein by reference.

FIELD

The present invention relates to an air conditioner including an inverter.

BACKGROUND

A conventional air conditioner including an inverter rotates a blower at a rotational speed corresponding to the air volume and air speed set by a user. A motor driving the blower is rotated either as a three-phase system that switches switching elements for three phases or as a two-phase system that fixes one of three phases to high or low and switches switching elements for two phases (refer to Patent Literature 1, for example).

Compared to the three-phase system, the two-phase system can reduce a power loss at the time of switching and also a power loss due to an overshoot. As for the waveform for driving the motor, on the other hand, the waveform of the three-phase system is smoother than the waveform of the two-phase system so that noise and vibration generated by the rotation of the motor are smaller in the three-phase system than in the two-phase system.

CITATION LIST

Patent Literature

Patent Literature 1: Japanese Patent Application Laid-open. No, 2003-209976

SUMMARY

Technical Problem

The conventional air conditioner switches operation between the two-phase system and the three-phase system by comparing a preset fixed value and a specific rotational speed which is a rotation number per unit time corresponding to a combination of the air volume and the air speed set by a user. That is, the conventional air conditioner uses the fixed value in the determination of switching operation between the two-phase system and the three-phase system, and does not perform switching in accordance with the operating environment of the air conditioner. An air conditioner that switches operation between the two-phase system and the three-phase system depending on the operating environment is demanded.

The present invention has been made in view of the above, and an object of the present invention is to obtain an air conditioner that switches operation between the two-phase system and the three-phase system depending on the operating environment.

Solution to Problem

In order to solve the above problem and achieve the object, an air conditioner according to the present invention includes a blower that blows air into space, an inverter that drives the blower, a receiver that receives an instruction to change a condition of air in the space, and a controller that controls the inverter on the basis of the instruction received by the receiver. The inverter includes a motor that drives the blower and an inverter circuit that rotates the motor as either a two-phase system or a three-phase system. The instruction includes air information specifying an air volume and an air speed, and mode information specifying an operation mode. The controller includes: a rotational speed storage unit that stores a rotational speed of the motor for each of a plurality of combinations of the air volume and the air speed; a correction value storage unit that stores a positive or negative correction value in each of a first case corresponding to operation in a power saving mode and a sleeping mode, a second case corresponding to operation in the power saving mode and a non-sleeping mode, a third case corresponding to operation in a non-power saving mode and the sleeping mode, and a fourth case corresponding to operation in the non-power saving mode and the non-sleeping mode for each of a plurality of the operation modes; and a fixed value storage unit that stores a predetermined fixed value. The controller further includes: a rotational speed acquisition unit that acquires, from the rotational speed storage unit, a specific rotational speed that is a rotation number per unit time corresponding to a combination of the air volume and the air speed specified by the air information; a correction value acquisition unit that determines the operation mode specified by the mode information included in the instruction, determines whether or not the instruction includes a request to operate in the power saving mode, determines whether or not the instruction includes a request to operate in the sleeping mode, and acquires a specific correction value corresponding to a result obtained by the determination from among a plurality of the correction values stored in the correction value storage unit; and a fixed value acquisition unit that acquires the fixed value from the fixed value storage unit. The controller further includes: a calculation unit that calculates a threshold for selecting either two-phase operation or three-phase operation by adding the specific correction value acquired by the correction value acquisition unit to the fixed value acquired by the fixed value acquisition unit; a rotational speed determination unit that determines whether or not the specific rotational speed acquired by the rotational speed acquisition unit is lower than the threshold calculated by the calculation unit; and a selection unit that selects the three-phase operation when the rotational speed determination unit determines that the specific rotational speed is lower than the threshold, or selects the two-phase operation when the rotational speed determination unit determines that the specific rotational speed is higher than or equal to the threshold. The inverter circuit rotates the motor as either the two-phase system or the three-phase system in accordance with the selection made by the selection unit.

Advantageous Effects of Invention

The air conditioner according to the present invention can switch operation between the two-phase system and the three-phase system depending on the operating environment.

DESCRIPTION OF EMBODIMENTS

An air conditioner according to embodiments of the present invention will now be described in detail with reference to the drawings. Note that the present invention is not limited to the embodiments.

First Embodiment.

Figure 1:
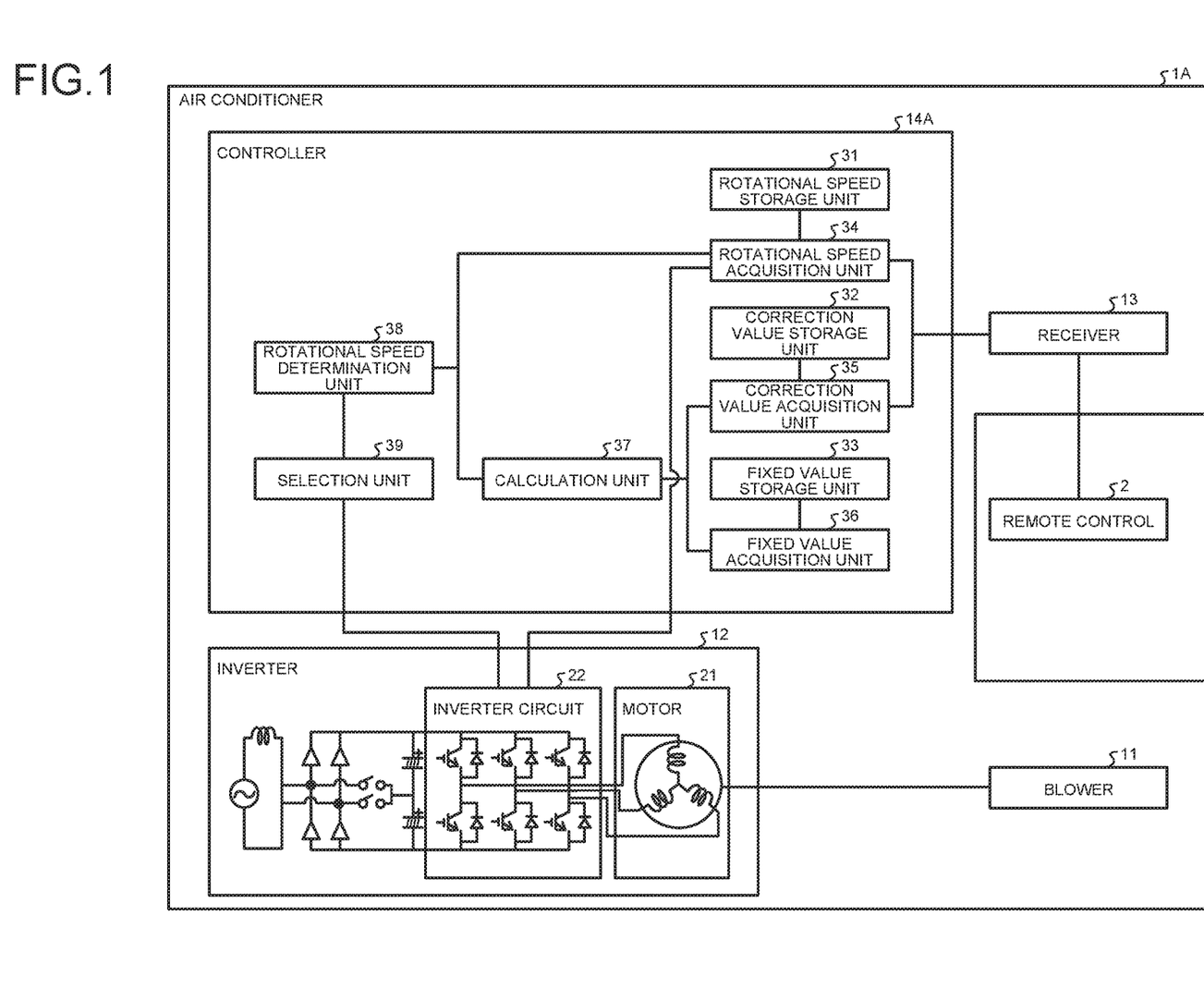
FIG. 1 is a diagram illustrating the configuration of an air conditioner according to a first embodiment.

First, the configuration of an air conditioner 1A of a first embodiment will be described. FIG. 1 is a diagram illustrating the configuration of the air conditioner 1A of the first embodiment. The air conditioner 1A includes a blower 11 that blows air into space, an inverter 12 that drives the blower 11, a receiver 13 that receives an instruction to change a condition of air in the space, and a controller 14A that controls the inverter 12 on the basis of the instruction received by the receiver 13.

The receiver 13 receives, from a remote control 2, an instruction that is made on the remote control 2 by a user operating the remote control 2. For example, the remote control 2 transmits an instruction to the receiver 13 using electromagnetic waves, and the receiver 13 accepts an instruction by receiving the instruction through electromagnetic waves. Alternatively, the receiver 13 receives an instruction that is made by the user on an operation panel provided on a casing of the air conditioner 1A from the operation panel. FIG. 1 does not illustrate the operation panel.

The instruction received by the receiver 13 includes mode information specifying an operation mode, temperature information specifying temperature, and air information specifying an air volume and an air speed. The operation mode corresponds to any one of cooling operation, heating operation, and dehumidifying operation. The instruction may include a request to operate in a power saving mode. The instruction may include a request to operate in a sleeping mode.

The inverter 12 includes a motor 21 that drives the blower 11 and an inverter circuit 22 that rotates the motor 21 as either a two-phase system or a three-phase system. The motor 21 rotates as either the two-phase system or the three-phase system under the control of the inverter circuit 22.

The controller 14A includes a rotational speed storage unit 31 that stores a rotational speed of the motor 21 for each of a plurality of combinations of the air volume and the air speed. A specific example of the rotational speed storage unit 31 is a read only memory (ROM). The controller 14A further includes a correction value storage unit 32 that stores a positive or negative correction value in each of a first case corresponding to operation in the power saving mode and the sleeping mode, a second case corresponding to operation in the power saving mode and a non-sleeping mode, a third case corresponding to operation in a non-power saving mode and the sleeping mode, and a fourth case corresponding to operation in the non-power saving mode and the non-sleeping mode for each of the plurality of operation modes. A specific example of the correction value storage unit 32 is a ROM. The plurality of operation modes corresponds to the cooling operation, the heating operation, and the dehumidifying operation.

The controller 14A further includes a fixed value storage unit 33 that stores a predetermined fixed value. The fixed value is a reference value used for determining switching of the operation between the two-phase system and the three-phase system by a conventional air conditioner. A specific example of the fixed value storage unit 33 is a ROM. The controller 14A further includes a rotational speed acquisition unit 34 that acquires, from the rotational speed storage unit 31, a specific rotational speed which is the rotation number per unit time corresponding to a combination of the air volume and the air speed specified by the air information that is included in the instruction received by the receiver 13.

The controller 14A further includes a correction value acquisition unit 35 that determines the operation mode specified by the mode information included in the instruction received by the receiver 13, determines whether or not the instruction includes a request to operate in the power saving mode, determines whether or not the instruction includes a request to operate in the sleeping mode, and acquires a specific correction value corresponding to a result obtained by the determination from among a plurality of correction values stored in the correction value storage unit 32.

The controller 14A further includes a fixed value acquisition unit 36 that acquires the fixed value from the fixed value storage unit 33, and a calculation unit 37 that calculates a threshold for selecting either the two-phase operation or the three-phase operation by adding the specific correction value acquired by the correction value acquisition unit 35 to the fixed value acquired by the fixed value acquisition unit 36. Note that each of the plurality of correction values stored in the correction value storage unit 32 is set such that the threshold calculated by the calculation unit 37 does not exceed the maximum rotational speed of the motor 21. The correction values stored in the correction value storage unit 32 will be described again following the description of a selection unit 39.

The controller 14A further includes a rotational speed determination unit 38 that determines whether or not the specific rotational speed acquired by the rotational speed acquisition unit 34 is smaller than the threshold calculated by the calculation unit 37. The controller 14A further includes the selection unit 39 that selects the three-phase operation when the rotational speed determination unit 38 determines that the specific rotational speed is lower than the threshold, or selects the two-phase operation when the rotational speed determination unit 38 determines that the specific rotational speed is higher than or equal to the threshold.

The correction values stored in the correction value storage unit 32 will be further described. The correction value is a positive value in the sleeping mode such that the three-phase operation reducing one or both of vibration and noise accompanying the rotation of the motor 21 is performed as much as possible. The correction value is a negative value in the power saving mode such that the two-phase operation reducing energy consumption of the motor 21 is performed as much as possible. In the sleeping mode, the air conditioner is highly likely to perform the three-phase operation since the threshold is high. In the power saving mode, the air conditioner is highly likely to perform the two-phase operation since the threshold is low.

The inverter circuit 22 of the inverter 12 rotates the motor 21 as either the two-phase system or the three-phase system in accordance with the selection made by the selection unit 39 of the controller 14A. Under control of the inverter circuit 22, the motor 21 rotates as either the two-phase system or the three-phase system at the specific rotational speed corresponding to a combination of the air volume and the air speed specified by the air information included in the instruction received by the receiver 13, thereby driving the blower 11. Note that the temperature of air blown out from the blower 11 into space is controlled by a heat exchanger not illustrated in FIG. 1 on the basis of the temperature information included in the instruction.

Figure 2:
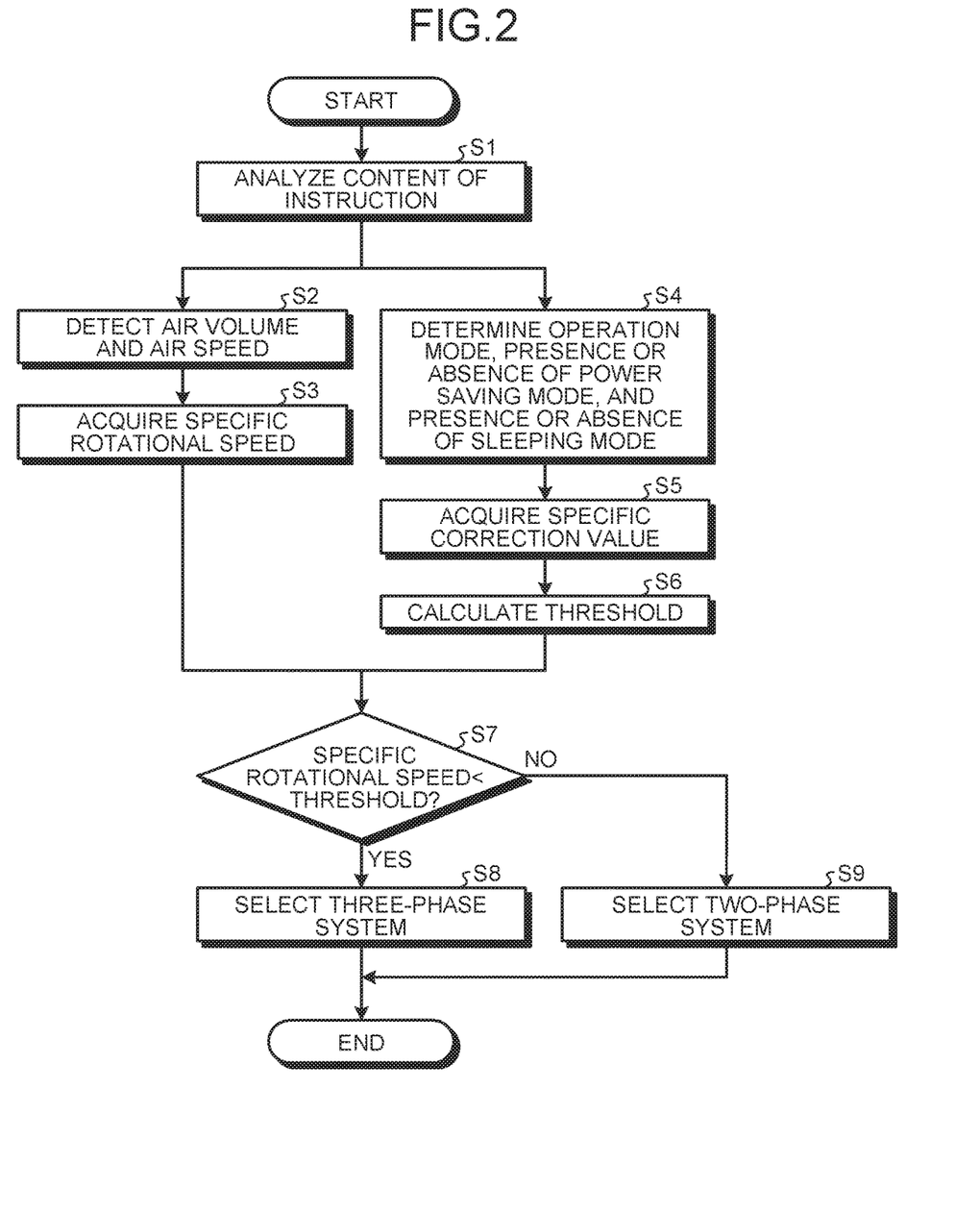
FIG. 2 is a flowchart illustrating a procedure of the operation performed by a controller of the air conditioner according to the first embodiment.

Next, the operation of the air conditioner 1A of the first embodiment will be described. FIG. 2 is a flowchart illustrating a procedure of the operation performed by the controller 14A of the air conditioner 1A according to the first embodiment. Upon receiving an instruction, the receiver 13 outputs the received instruction to the rotational speed acquisition unit 34 and the correction value acquisition unit 35, whereby the rotational speed acquisition unit 34 and the correction value acquisition unit 35 analyze the content of the instruction (S1). As described above, the instruction includes the air information specifying the air volume and the air speed, and the mode information specifying the operation mode. The instruction may include a request to operate in a power saving mode. The instruction may include a request to operate in a sleeping mode.

The rotational speed acquisition unit 34 detects the air volume and the air speed specified by the air information included in the instruction received by the receiver 13 (S2), and acquires, from the rotational speed storage unit 31, the specific rotational speed which is the rotation number per unit time corresponding to the combination of the air volume and the air speed being detected (S3). The correction value acquisition unit 35 determines the operation mode specified by the mode information included in the instruction received by the receiver 13, determines whether or not the instruction includes the request to operate in the power saving mode, and determines whether or not the instruction includes the request to operate in the sleeping mode (S4). That is, in step S4, the correction value acquisition unit 35 determines the operation mode, the presence or absence of the power saving mode, and the presence or absence of the sleeping mode. The correction value acquisition unit 35 acquires a specific correction value corresponding to a result of the determination acquired from among the plurality of correction values stored in the correction value storage unit 32 (S5). Note that the operations in steps S2 and S3 may be performed in parallel with the operations in steps S4, S5, and S6, or may be performed before or after the operations in steps S4, S5, and S6.

The fixed value acquisition unit 36 acquires the fixed value from the fixed value storage unit 33. The calculation unit 37 calculates the threshold for selecting either the two-phase operation or the three-phase operation by adding the specific correction value acquired by the correction value acquisition unit 35 to the fixed value acquired by the fixed value acquisition unit 36 and (S6). The rotational speed determination unit 38 determines whether or not the specific rotational speed acquired by the rotational speed acquisition unit 34 is smaller than the threshold calculated by the calculation unit 37 (S7).

The selection unit 39 selects the three-phase operation (S8) if the rotational speed determination unit 38 determines that the specific rotational speed is lower than the threshold (Yes in S7). The selection unit 39 selects the two-phase operation (S9) if the rotational speed determination unit 38 determines that the specific rotational speed is higher than or equal to the threshold (No in S7).

The inverter circuit 22 of the inverter 12 rotates the motor 21 as either the two-phase system or the three-phase system in accordance with the selection made by the selection unit 39 of the controller 14A. Under control of the inverter circuit 22, the motor 21 rotates as either the two-phase system or the three-phase system at the specific rotational speed corresponding to a combination of the air volume and the air speed specified by the air information included in the instruction received by the receiver 13, thereby driving the blower 11. Note that the temperature of air blown out from the blower 11 into space is controlled by a heat exchanger not illustrated in FIG. 1 on the basis of the temperature information included in the instruction. Moreover, the controller 14A performs the operations on the flowchart of FIG. 2 every time the receiver 13 receives an instruction.

As described above, the air conditioner 1A according to the first embodiment does not determine whether or not the specific rotational speed acquired by the rotational speed acquisition unit 34 is lower than the fixed value which is the reference value used to determine switching of the operation between the two-phase system and the three-phase system by the conventional air conditioner. The air conditioner 1A selects either the two-phase system or the three-phase system on the basis of the specific rotational speed and the threshold calculated using the specific correction value that depends on the presence or absence of the power saving mode and the presence or absence of the sleeping mode. That is, the air conditioner 1A can switch operation between two-phase system and the three-phase system depending on the operating environment such as the presence or absence of the power saving mode and the presence or absence of the sleeping mode.

When the instruction received by the receiver 13 includes the request to operate in the power saving mode, for example, the specific rotational speed is highly likely to be higher than or equal to the threshold since the specific correction value is a negative value and lowers the threshold. As a result, the air conditioner 1A is more likely to perform the two-phase operation which reduces the energy consumption of the motor 21. When the instruction includes the request to operate in the sleeping mode, the specific rotational speed is highly likely to be lower than the threshold since the specific correction value is a positive value and increases the threshold. As a result, the air conditioner 1A is more likely to perform the three-phase operation which reduces one or both of vibration and noise accompanying the rotation of the motor 21.

Second Embodiment.

Figure 3:
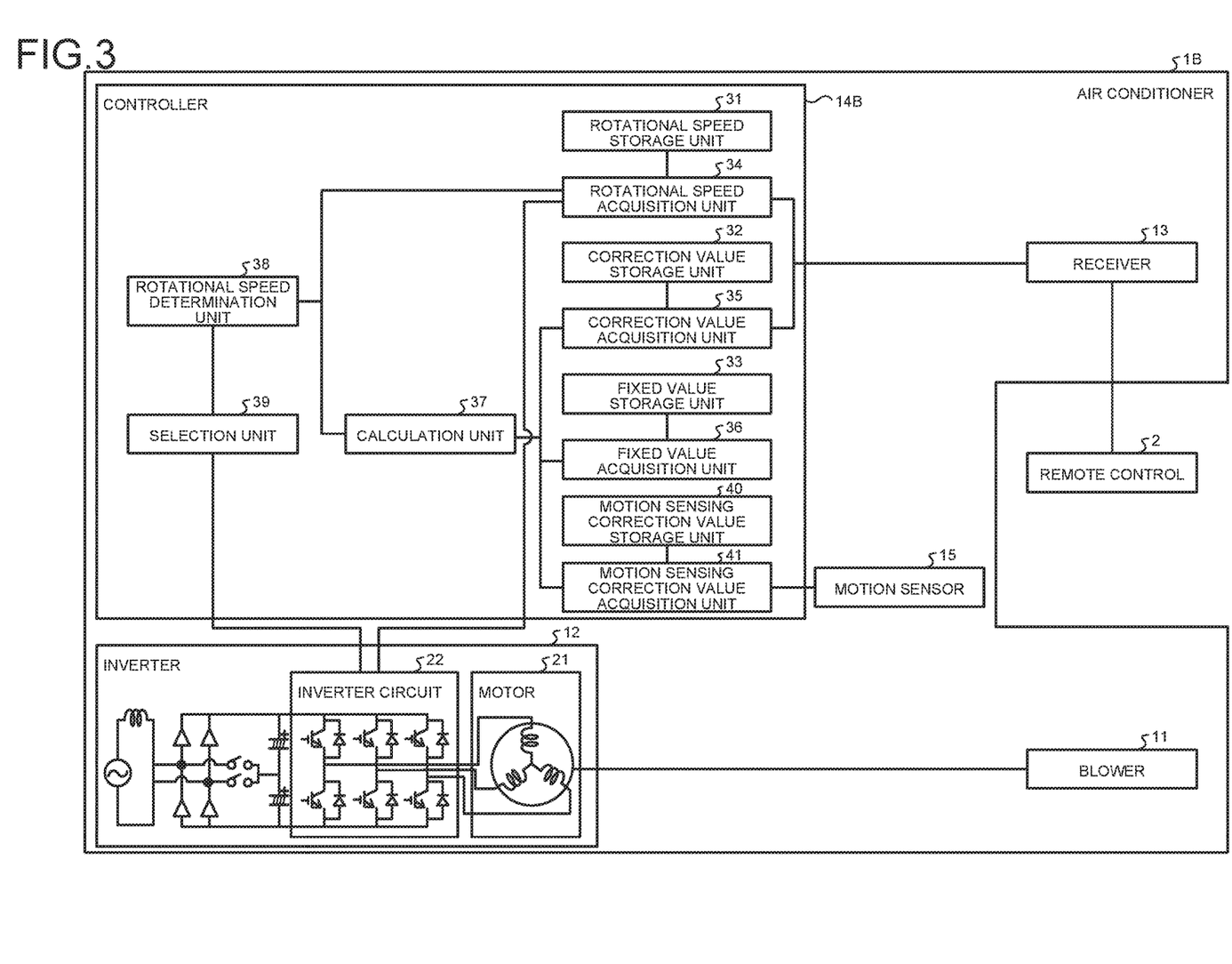
FIG. 3 is a diagram illustrating the configuration of an air conditioner according to a second embodiment.

Next, an air conditioner 1B of a second embodiment will be described. FIG. 3 is a diagram illustrating the configuration of the air conditioner 1B of the second embodiment. The air conditioner 1B includes a motion sensor 15 as well as all the components included in the air conditioner 1A of the first embodiment. The controller 14A of the air conditioner 1A in the first embodiment is replaced by a controller 14B in the second embodiment. The controller 14B includes a motion sensing correction value storage unit 40 and a motion sensing correction value acquisition unit 41 as well as all the components included in the controller 14A. The second embodiment mainly describes differences from the first embodiment.

When a person is present in the space into which the blower 11 blows air, the motion sensor 15 detects the presence of the person in the space. The motion sensing correction value storage unit 40 stores a first motion sensing correction value that is a positive value corresponding to a case where a person is present in the space, and a second motion sensing correction value that is a negative value corresponding to a case where no person is present in the space. Specifically, the first motion sensing correction value is a correction value for increasing the probability that the air conditioner performs the three-phase operation which reduces one or both of vibration and noise accompanying the rotation of the motor 21 when a person is present in the space. The second motion sensing correction value is a correction value for increasing the probability that the air conditioner performs the two-phase operation which reduces energy consumption of the motor 21 when no person is present in the space.

The motion sensing correction value acquisition unit 41 determines whether or not an instruction received by the receiver 13 includes a request for operation using a result of detection by the motion sensor 15. Upon determining that the instruction includes the request for operation using the result of detection by the motion sensor 15, the motion sensing correction value acquisition unit 41 acquires the first motion sensing correction value from the motion sensing correction value storage unit 40 when the motion sensor 15 detects the presence of a person in the space, or acquires the second motion sensing correction value from the motion sensing correction value storage unit 40 when the motion sensor 15 does not detect the presence of a person in the space.

The calculation unit 37 calculates a threshold by adding the specific correction value acquired by the correction value acquisition unit 35 and the first motion sensing correction value or the second motion sensing correction value acquired by the motion sensing correction value acquisition unit 41 to the fixed value acquired by the fixed value acquisition unit 36. As in the first embodiment, the rotational speed determination unit 38 determines whether or not the specific rotational speed acquired by the rotational speed acquisition unit 34 is lower than the threshold calculated by the calculation unit 37, so that the selection unit 39 selects the three-phase operation if the specific rotational speed is lower than the threshold or selects the two-phase operation if the specific rotational speed is higher than or equal to the threshold.

Figure 4:
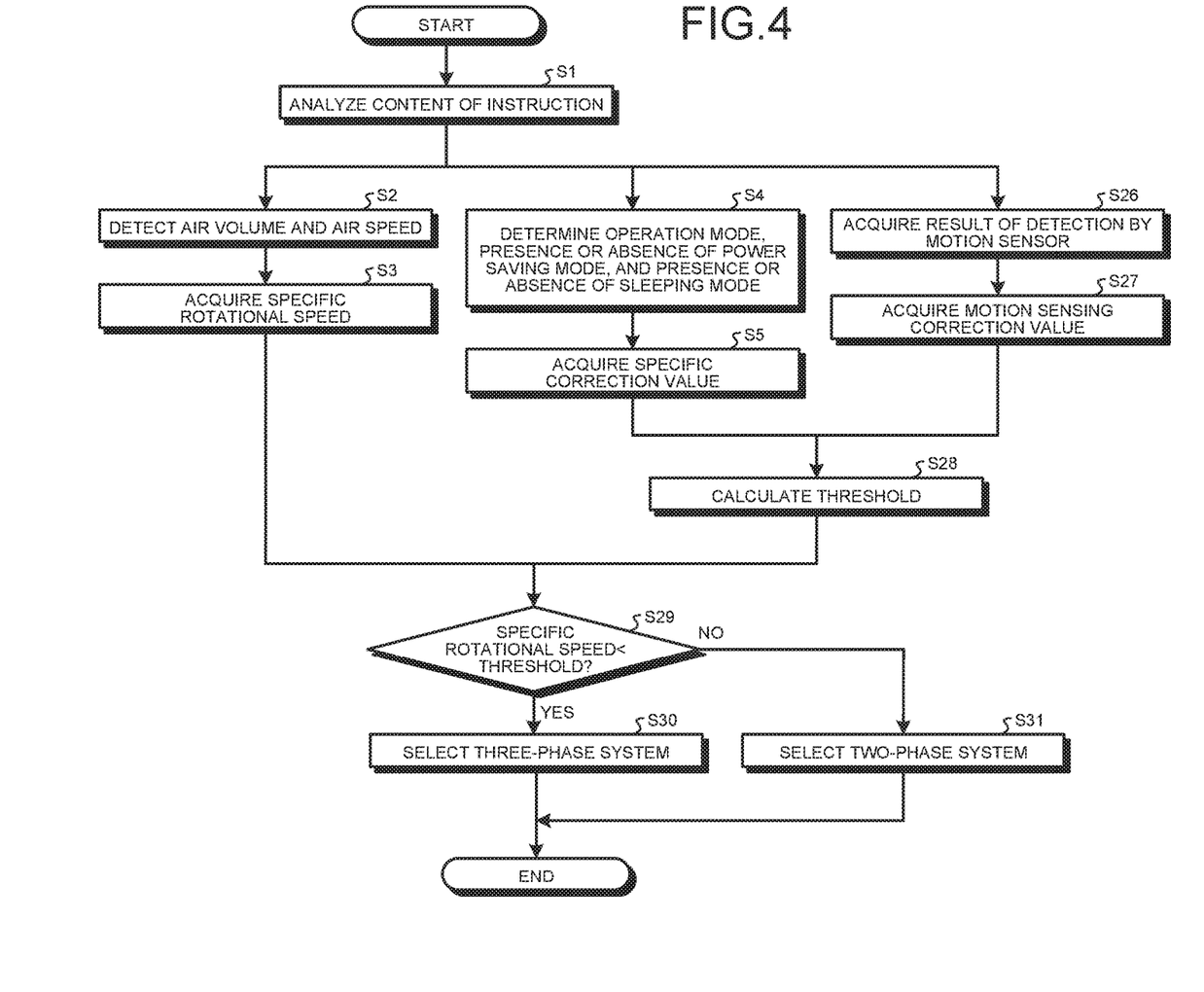
FIG. 4 is a flowchart illustrating a procedure of the operation performed by a controller of the air conditioner according to the second embodiment.

Next, the operation of the air conditioner 1B of the second embodiment will be described. FIG. 4 is a flowchart illustrating a procedure of the operation performed by the controller 14B of the air conditioner 1B according to the second embodiment. Steps S1 to S5 are the same as steps S1 to S5 of the first embodiment. Note that the instruction received by the receiver 13 is assumed to include the request for operation using the result of detection by the motion sensor 15.

In step S26, the motion sensing correction value acquisition unit 41 acquires the result of detection by the motion sensor 15 from the motion sensor 15. The motion sensing correction value acquisition unit 41 acquires the first motion sensing correction value from the motion sensing correction value storage unit 40 (S27) when the result of detection indicates the presence of a person in the space, that is, when the motion sensor 15 detects the presence of a person in the space. On the other hand, the motion sensing correction value acquisition unit 41 acquires the second motion sensing correction value from the motion sensing correction value storage unit 40 (S27) when the result of detection indicates no presence of a person in the space, that is, when the motion sensor 15 does not detect the presence of a person in the space.

The fixed value acquisition unit 36 acquires the fixed value from the fixed value storage unit 33. The calculation unit 37 calculates the threshold for selecting either the two-phase operation or the three-phase operation by adding, to the fixed value acquired by the fixed value acquisition unit 36, the specific correction value acquired by the correction value acquisition unit 35 and the first motion sensing correction value or the second motion sensing correction value acquired by the motion sensing correction value acquisition unit 41 (S28). The rotational speed determination unit 38 determines whether or not the specific rotational speed acquired by the rotational speed acquisition unit 34 is lower than the threshold calculated by the calculation unit 37 (S29).

The selection unit 39 selects the three-phase operation (S30) if the rotational speed determination unit 38 determines that the specific rotational speed is lower than the threshold (Yes in S29). The selection unit 39 selects the two-phase operation (S31) if the rotational speed determination unit 38 determines that the specific rotational speed is higher than or equal to the threshold (No in S29).

As described above, the air conditioner 1B according to the second embodiment selects either the two-phase system or the three-phase system on the basis of the threshold that is calculated by using the specific correction value depending on the presence or absence of the power saving mode and the presence or absence of the sleeping mode, and the first motion sensing correction value or the second motion sensing correction value depending on the result of detection by the motion sensor 15. That is, the air conditioner 1B can switch operation between two-phase system and the three-phase system depending on the operating environment being the presence or absence of the power saving mode and the presence or absence of the sleeping mode, and the operating environment being the presence or absence of a person in the space.

The motion sensing correction value storage unit 40 stores a first motion sensing correction value that is a positive value corresponding to a case where a person is present in the space, and a second motion sensing correction value that is a negative value corresponding to a case where no person is present in the space. The calculation unit 37 calculates the threshold by adding, to the fixed value, the specific correction value and the first motion sensing correction value or the second motion sensing correction value. The selection unit 39 selects the three-phase operation when the specific rotational speed is lower than the threshold, or selects the two-phase operation when the specific rotational speed is higher than or equal to the threshold.

When a person is present in the space, the calculation unit 37 calculates the threshold using the first motion sensing correction value which is a positive value, so that the threshold is high and that the specific rotational speed is highly likely to be lower than the threshold. As a result, the air conditioner is more likely to perform the three-phase operation which reduces one or both of vibration and noise accompanying the rotation of the motor 21. When no person is present in the space, on the other hand, the calculation unit 37 calculates the threshold using the second motion sensing correction value which is a negative value, so that the threshold is low and that the specific rotational speed is highly likely to be higher than or equal to the threshold. As a result, the air conditioner is more likely to perform the two-phase operation which reduces the energy consumption of the motor 21 rather than reducing vibration or noise.

Third Embodiment.

Figure 5:
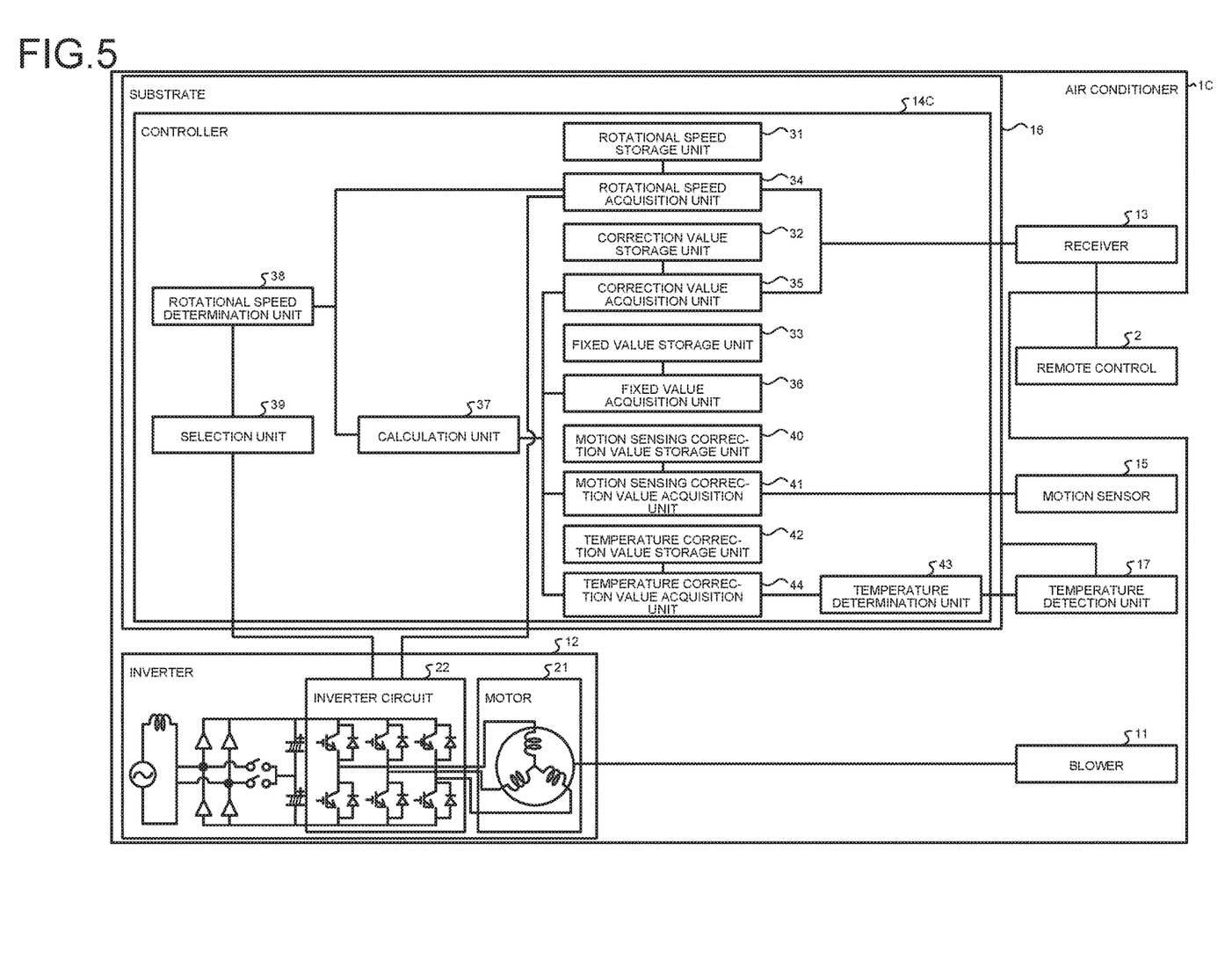
FIG. 5 is a diagram illustrating the configuration of an air conditioner according to a third embodiment.

Next, an air conditioner 1C of a third embodiment will be described. FIG. 5 is a diagram illustrating the configuration of the air conditioner 1C of the third embodiment. The air conditioner 1C includes a substrate 16 and a temperature sensor 17 detecting the temperature of the substrate 16 as well as all the components included in the air conditioner 1B of the second embodiment. The controller 14B of the air conditioner 1B in the second embodiment is replaced by a controller 14C in the third embodiment. The controller 14C includes a temperature correction value storage unit 42, a temperature determination unit 43, and a temperature correction value acquisition unit 44 as well as all the components included in the controller 14B. The third embodiment mainly describes differences from the second embodiment.

The controller 14C is placed on a plane of the substrate 16 in contact with the plane. The temperature sensor 17 detects the temperature of the substrate 16 on which the controller 14C including the plurality of components is placed. The temperature sensor 17 detects the temperature of the substrate 16 by using a thermistor connected to the plane of the substrate 16, for example.

In the controller 14C, the temperature correction value storage unit 42 stores a temperature correction value which is a negative value used when the temperature of the substrate 16 is higher than or equal to a preset reference temperature. The temperature correction value is a correction value for protecting the air conditioner 1C. The temperature determination unit 43 determines whether or not the temperature of the substrate 16 detected by the temperature sensor 17 is higher than or equal to the reference temperature. The temperature correction value acquisition unit 44 acquires the temperature correction value from the temperature correction value storage unit 42 only when the temperature determination unit 43 determines that the temperature of the substrate 16 is higher than or equal to the reference temperature.

When the temperature determination unit 43 determines that the temperature of the substrate 16 is higher than or equal to the reference temperature, the calculation unit 37 calculates a threshold by adding, to the fixed value acquired by the fixed value acquisition unit 36, the specific correction value acquired by the correction value acquisition unit 35, the first motion sensing correction value or the second motion sensing correction value acquired by the motion sensing correction value acquisition unit 41, and the temperature correction value acquired by the temperature correction value acquisition unit 44. When the temperature determination unit 43 determines that the temperature of the substrate 16 is lower than the reference temperature, the calculation unit 37 calculates a threshold by adding, to the fixed value acquired by the fixed value acquisition unit 36, the specific correction value acquired by the correction value acquisition unit 35 and the first motion sensing correction value or the second motion sensing correction value acquired by the motion sensing correction value acquisition unit 41. That is, the calculation unit 37 calculates the threshold without using the temperature correction value when the temperature of the substrate 16 is lower than the reference temperature.

As in the second embodiment, the rotational speed determination unit 38 determines whether or not the specific rotational speed acquired by the rotational speed acquisition unit 34 is lower than the threshold calculated by the calculation unit 37, so that the selection unit 39 selects the three-phase operation if the specific rotational speed is lower than the threshold or selects the two-phase operation if the specific rotational speed is higher than or equal to the threshold.

Figure 6:
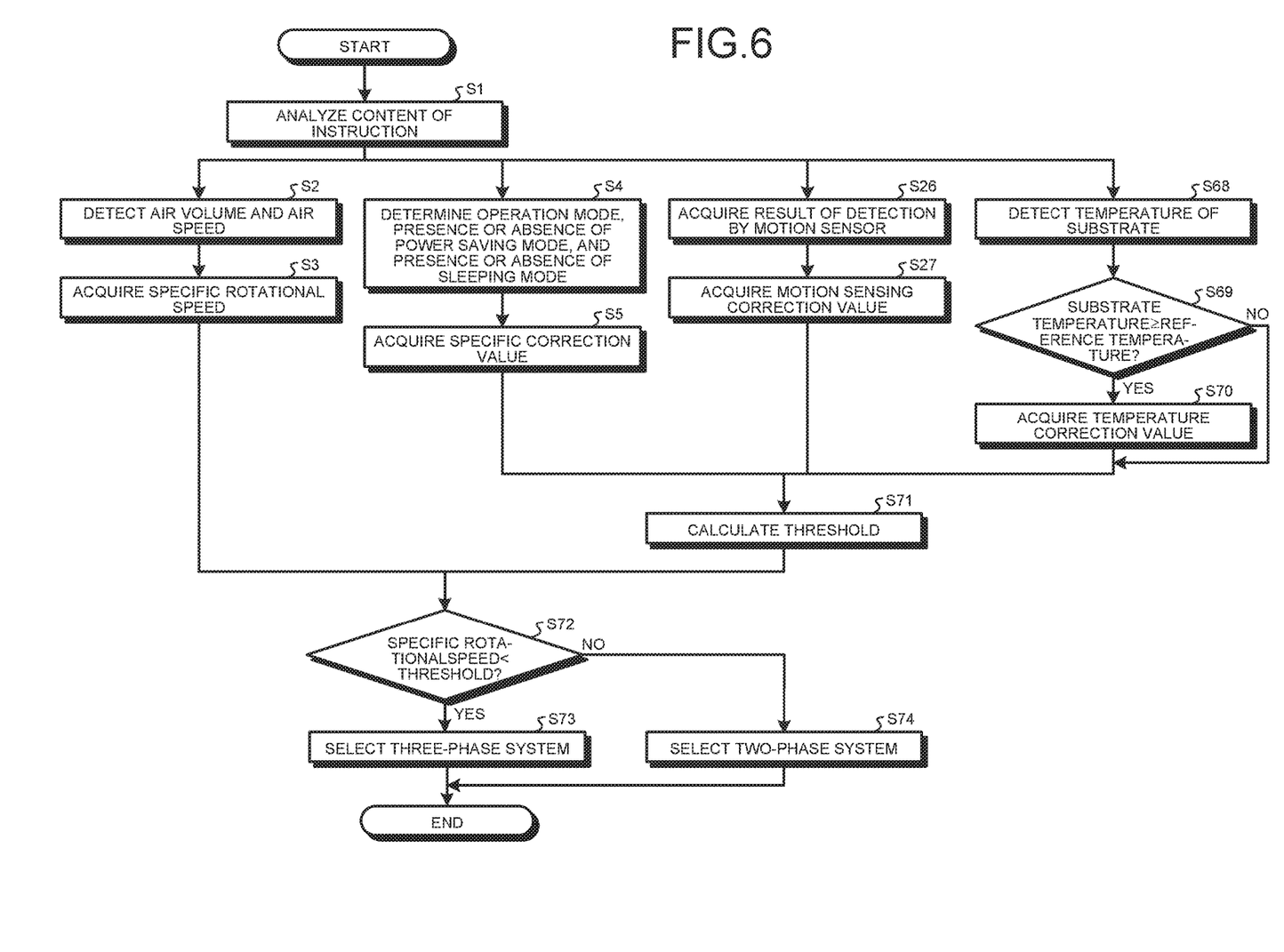
FIG. 6 is a flowchart illustrating a procedure of the operation performed by a controller of the air conditioner according to the third embodiment.

Next, the operation of the air conditioner 1C of the third embodiment will be described. FIG. 6 is a flowchart illustrating a procedure of the operation performed by the controller 14C of the air conditioner 1C according to the third embodiment. Steps S1 to S5, S26, and S27 are the same as steps S1 to S5, S26, and S27 of the second embodiment. Note that the instruction received by the receiver 13 is assumed to include a request for operation based on the temperature of the substrate 16.

In step S68, the temperature sensor 17 detects the temperature of the substrate 16. The temperature determination unit 43 determines whether or not the temperature of the substrate 16 detected by the temperature sensor 17 is higher than or equal to the reference temperature (S69). If the temperature determination unit 43 determines that the temperature of the substrate 16 is lower than the reference temperature (No in S69), the operation of the controller 14C shifts to step S71. If the temperature determination unit 43 determines that the temperature of the substrate 16 is higher than or equal to the reference temperature (Yes in S69), the temperature correction value acquisition unit 44 acquires the temperature correction value from the temperature correction value storage unit 42 (S70).

The fixed value acquisition unit 36 acquires the fixed value from the fixed value storage unit 33. If the temperature of the substrate 16 is higher than or equal to the reference temperature (Yes in S69), the calculation unit 37 calculates the threshold by adding, to the fixed value acquired by the fixed value acquisition unit 36, the specific correction value acquired by the correction value acquisition unit 35, the first motion sensing correction value or the second motion sensing correction value acquired by the motion sensing correction value acquisition unit 41, and the temperature correction value acquired by the temperature correction value acquisition unit 44 (S71). If the temperature of the substrate 16 is lower than the reference temperature (No in S69), the calculation unit 37 calculates the threshold by adding, to the fixed value acquired by the fixed value acquisition unit 36, the specific correction value acquired by the correction value acquisition unit 35 and the first motion sensing correction value or the second motion sensing correction value acquired by the motion sensing correction value acquisition unit 41 (S71).

The rotational speed determination unit 38 determines whether or not the specific rotational speed acquired by the rotational speed acquisition unit 34 is lower than the threshold calculated by the calculation unit 37 (S72). The selection unit 39 selects the three-phase operation (S73) if the rotational speed determination unit 38 determines that the specific rotational speed is lower than the threshold (Yes in S72). The selection unit 39 selects the two-phase operation (S74) if the rotational speed determination unit 38 determines that the specific rotational speed is higher than or equal to the threshold (No in S72).

As described above, the air conditioner 1C according to the third embodiment selects either the two-phase system or the three-phase system on the basis of the threshold that is calculated by using the specific correction value depending on the presence or absence of the power saving mode and the presence or absence of the sleeping mode, and the first motion sensing correction value or the second motion sensing correction value depending on the result of detection by the motion sensor 15. That is, the air conditioner 1C can switch operation between the two-phase system and the three-phase system depending on the operating environment being the presence or absence of the power saving mode and the presence or absence of the sleeping mode, and the operating environment being the presence or absence of a person in the space.

When the temperature of the substrate 16 is higher than or equal to the reference temperature in the third embodiment, the calculation unit 37 calculates the threshold using the temperature correction value which is a negative value so that the specific rotational speed is highly likely to be higher than or equal to the threshold. Thus, the air conditioner is more likely to perform the two-phase operation which performs switching fewer times and is less likely to generate heat. The air conditioner 1C can be protected as a result. In a case where the temperature of the substrate 16 shifts from a state higher than or equal to the reference temperature to a state lower than the reference temperature, the threshold is calculated without using the temperature correction value which is a negative value so that the air conditioner is more likely to perform the three-phase operation.

Figure 7:
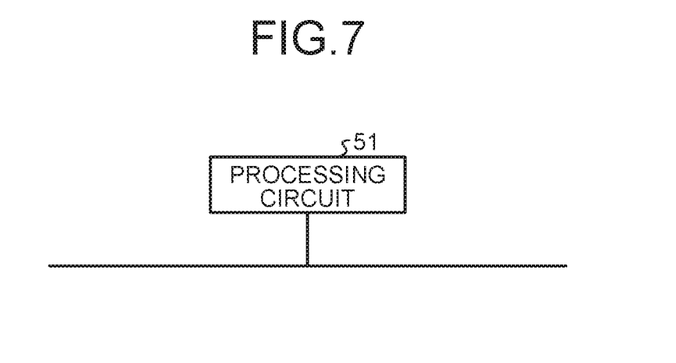
FIG. 7 is a diagram illustrating that at least a part of components included in the controller of the air conditioner of the first embodiment is a processing circuit.

Note that a part or all of the functions of the plurality of components included in the controller 14A of the air conditioner 1A of the first embodiment may be implemented by a processing circuit 51, the components being the rotational speed acquisition unit 34, the correction value acquisition unit 35, the fixed value acquisition unit 36, the calculation unit 37, the rotational speed determination unit 38, and the selection unit 39. FIG. 7 is a diagram illustrating that at least a part of the components included in the controller 14A of the air conditioner 1A of the first embodiment is the processing circuit 51. The processing circuit 51 is dedicated hardware. That is, for example, the processing circuit 51 is a single circuit, a complex circuit, a programmed processor, a parallel-programmed processor, an application specific integrated circuit (ASIC), a field programmable gate array (FPGA), or a combination of those. A part of the plurality of components being the rotational speed acquisition unit 34, the correction value acquisition unit 35, the fixed value acquisition unit 36, the calculation unit 37, the rotational speed determination unit 38, and the selection unit 39 included in the controller 14A may be dedicated hardware separate from the rest of the components.

Figure 8:
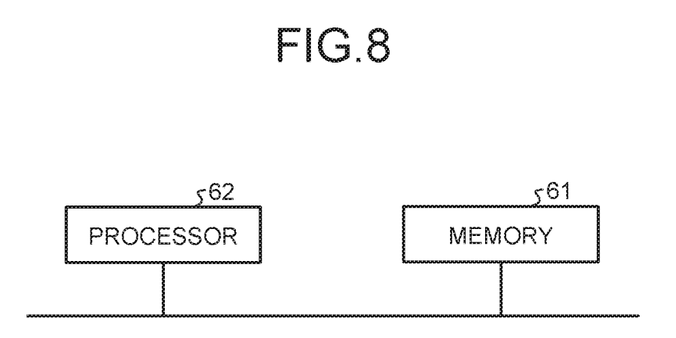
FIG. 8 is a diagram illustrating that at least a part of the components included in the controller of the air conditioner of the first embodiment is a processor.

A part or all of the plurality of components being the rotational speed acquisition unit 34, the correction value acquisition unit 35, the fixed value acquisition unit 36, the calculation unit 37, the rotational speed determination unit 38, and the selection unit 39 included in the controller 14A may be a processor 62 that executes a program stored in a memory 61. FIG. 8 is a diagram illustrating that at least a part of the components included in the controller 14A of the air conditioner 1A of the first embodiment is the processor 62. The processor 62 is a central processing unit (CPU), a processing unit, an arithmetic unit, a microprocessor, a microcomputer, or a digital signal processor (DSP).

In the case where at least a part of the components included in the controller 14A is the processor 62, the function of at least the part of the components included in the controller 14A is implemented by the processor 62 and software, firmware, or a combination of software and firmware. The software or firmware is described as a program and stored in the memory 61. The processor 62 reads and executes the program stored in the memory 61 to implement the function of the part of the components included in the controller 14A.

That is, when a part of the components included in the controller 14A is the processor 62, the controller 14A includes the memory 61 storing a program by which a step executed by the part of the components included in the controller 14A is eventually executed. In other words, the program stored in the memory 61 causes a computer to execute a procedure or method executed by the part of the components included in the controller 14A. The memory 61 is, for example, a non-volatile or volatile semiconductor memory such as a random access memory (RAM), a ROM, a flash memory, an erasable programmable read only memory (EPROM), or an electrically erasable programmable read only memory (EEPROM); a magnetic disk; a flexible disk; an optical disk; a compact disc; a mini disc; a digital versatile disk (DVD) or the like.

A part of the functions of the plurality of components included in the controller 14A may be implemented by dedicated hardware, while the rest of the functions may be implemented by software or firmware. The functions of the plurality of components included in the controller 14A can thus be implemented by hardware, software, firmware, or a combination of these.

A part or all of the functions of the receiver 13 in the air conditioner 1A of the first embodiment may be the processing circuit 51 or the processor 62. A part or all of the functions of the plurality of components included in the controller 14B of the air conditioner 1B of the second embodiment may be implemented by the processing circuit 51 or the processor 62, the components being the rotational speed acquisition unit 34, the correction value acquisition unit 35, the fixed value acquisition unit 36, the calculation unit 37, the rotational speed determination unit 38, the selection unit 39, and the motion sensing correction value acquisition unit 41. A part or all of the functions of the plurality of components included in the controller 14C of the air conditioner 1C of the third embodiment may be implemented by the processing circuit 51 or the processor 62, the components being the rotational speed acquisition unit 34, the correction value acquisition unit 35, the fixed value acquisition unit 36, the calculation unit 37, the rotational speed determination unit 38, the selection unit 39, the motion sensing correction value acquisition unit 41, the temperature determination unit 43, and the temperature correction value acquisition unit 44.

Each configuration illustrated in the above each embodiment merely illustrates an example of the content of the present invention, and can thus be combined with another known technique or partially omitted and/or modified without departing from the scope of the present invention.

REFERENCE SIGNS LIST

1A, 1B, 1C air conditioner; 2 remote control; 11 blower; 12 inverter; 13 receiver; 14A, 14B, 14C controller; 15 motion sensor; 16 substrate; 17 temperature sensor; 21 motor; 22 inverter circuit; 31 rotational speed storage unit; 32 correction value storage unit; 33 fixed value storage unit; 34 rotational speed acquisition unit; 35 correction value acquisition unit; 36 fixed value acquisition unit; 37 calculation unit; 38 rotational speed determination unit; 39 selection unit; 40 motion sensing correction value storage unit; 41 motion sensing correction value acquisition unit; 42 temperature correction value storage unit; 43 temperature determination unit; 44 temperature correction value acquisition unit; 51 processing circuit; 61 memory; 62 processor.

The invention claimed is:

1. An air conditioner comprising:
   a blower to blow air into space;
   an inverter to drive the blower; and
   a controller to control the inverter on the basis of an instruction for changing a condition of air in the space, wherein
   the inverter includes:
      a motor to drive the blower; and
      an inverter circuit to rotate the motor as either a two-phase system or a three-phase system,
   the instruction includes air information, and mode information that specifies an operation mode,
   the controller includes:
      a rotational speed memory to store a rotational speed corresponding to the air information;
      a correction value memory to store a correction value that is a positive value or a negative value for a power saving mode, a non-power saving mode, a sleeping mode, and a non-sleeping mode in each of the operation modes;
      a fixed value memory to store a predetermined fixed value;
      a rotational speed acquiror to acquire, from the rotational speed memory, a specific rotational speed that is a rotation number per unit time corresponding to a combination of an air volume and an air speed specified by the air information;
      a correction value acquiror to determine the operation mode specified by the mode information included in the instruction, determine whether or not the instruction includes a request to operate in the power saving mode, determine whether or not the instruction includes a request to operate in the sleeping mode, and acquire a specific correction value corresponding to a result obtained by the determination from among a plurality of the correction values stored in the correction value memory;
      a fixed value acquiror to acquire the fixed value from the fixed value memory;
      a calculator to calculate a threshold for selecting either two-phase operation or three-phase operation by adding the specific correction value acquired by the correction value acquiror to the fixed value acquired by the fixed value acquiror;
      a rotational speed determinator to determine whether or not the specific rotational speed acquired by the rotational speed acquiror is lower than the threshold calculated by the calculator; and
      a selector to select the three-phase operation when the rotational speed determinator determines that the specific rotational speed is lower than the threshold, or select the two-phase operation when the rotational speed determinator determines that the specific rotational speed is higher than or equal to the threshold, and
   the inverter circuit rotates the motor as either the two-phase system or the three-phase system in accordance with the selection made by the selector.

2. The air conditioner according to claim 1, further comprising a motion sensor to detect presence of a person in the space, wherein
   the controller further includes:
      a motion sensing correction value memory to store a first motion sensing correction value that is a positive value corresponding to a case where a person is present in the space and a second motion sensing correction value that is a negative value corresponding to a case where no person is present in the space; and
      a motion sensing correction value acquiror to acquire the first motion sensing correction value from the motion sensing correction value memory when the motion sensor detects presence of a person in the space, or acquire the second motion sensing correction value from the motion sensing correction value memory when the motion sensor does not detect presence of a person in the space, and
   the calculator calculates the threshold by adding, to the fixed value acquired by the fixed value acquiror, the specific correction value acquired by the correction value acquiror and the first motion sensing correction value or the second motion sensing correction value acquired by the motion sensing correction value acquiror.

3. The air conditioner according to claim 2, further comprising:
   a substrate; and
   a temperature sensor to detect temperature of the substrate, wherein
   the controller further includes:
      a temperature correction value memory to store a temperature correction value that is a negative value used when the temperature of the substrate is higher than or equal to a preset reference temperature;
      a temperature determinator to determine whether or not the temperature of the substrate detected by the temperature sensor is higher than or equal to the reference temperature; and
      a temperature correction value acquiror to acquire the temperature correction value from the temperature correction value memory only when the temperature determinator determines that the temperature of the substrate is higher than or equal to the reference temperature,
   the controller is placed on a plane of the substrate in contact with the plane, and
   the calculator calculates the threshold by adding, to the fixed value acquired by the fixed value acquiror, the specific correction value acquired by the correction value acquiror, the first motion sensing correction value or the second motion sensing correction value acquired by the motion sensing correction value acquiror, and the temperature correction value acquired by the temperature correction value acquiror.

4. The air conditioner according to claim 1, wherein
   the air information specifies an air volume and an air speed, and
   the rotational speed stored in the rotational speed memory is a rotational speed of the motor for each of a plurality of combinations of the air volume and the air speed.

5. The air conditioner according to claim 4, further comprising a motion sensor to detect presence of a person in the space, wherein
   the controller further includes:
      a motion sensing correction value memory to store a first motion sensing correction value that is a positive value corresponding to a case where a person is present in the space and a second motion sensing correction value that is a negative value corresponding to a case where no person is present in the space; and
      a motion sensing correction value acquiror to acquire the first motion sensing correction value from the motion sensing correction value memory when the motion sensor detects presence of a person in the space, or acquire the second motion sensing correction value from the motion sensing correction value memory when the motion sensor does not detect presence of a person in the space, and the calculator calculates the threshold by adding, to the fixed value acquired by the fixed value acquiror, the specific correction value acquired by the correction value acquiror and the first motion sensing correction value or the second motion sensing correction value acquired by the motion sensing correction value acquiror.

6. The air conditioner according to claim 5, further comprising:

a substrate; and a temperature sensor to detect temperature of the substrate, wherein the controller further includes:

a temperature correction value memory to store a temperature correction value that is a negative value used when the temperature of the substrate is higher than or equal to a preset reference temperature;

a temperature determinator to determine whether or not the temperature of the substrate detected by the temperature sensor is higher than or equal to the reference temperature; and a temperature correction value acquiror to acquire the temperature correction value from the temperature correction value memory only when the temperature determinator determines that the temperature of the substrate is higher than or equal to the reference temperature, the controller is placed on a plane of the substrate in contact with the plane, and the calculator calculates the threshold by adding, to the fixed value acquired by the fixed value acquiror, the specific correction value acquired by the correction value acquiror, the first motion sensing correction value or the second motion sensing correction value acquired by the motion sensing correction value acquiror, and the temperature correction value acquired by the temperature correction value acquiror.

* * * * *